Nov. 14, 1967    E. G. UGODIN ET AL    3,352,400
AUTOMOTIVE CONTINUOUS ACTION FACILITY
FOR UNLOADING BULK MATERIALS

Original Filed Oct. 5, 1964    4 Sheets-Sheet 1

Nov. 14, 1967  E. G. UGODIN ET AL  3,352,400
AUTOMOTIVE CONTINUOUS ACTION FACILITY
FOR UNLOADING BULK MATERIALS
Original Filed Oct. 5, 1964  4 Sheets-Sheet 3

Nov. 14, 1967   E. G. UGODIN ET AL   3,352,400
AUTOMOTIVE CONTINUOUS ACTION FACILITY
FOR UNLOADING BULK MATERIALS
Original Filed Oct. 5, 1964   4 Sheets-Sheet 4

United States Patent Office 3,352,400
Patented Nov. 14, 1967

3,352,400
AUTOMOTIVE CONTINUOUS ACTION FACILITY
FOR UNLOADING BULK MATERIALS
Evgeny Gavrilovich Ugodin, Abram Vladimirovich Lepsky, and Jury Vladimirovich Kamshitsky, Moscow, U.S.S.R., assignors to Vsesojuzny Nauchno-Issledovatelsky Institute Zheleznodorozhnogo transporta, Moscow, U.S.S.R.
Continuation of application Ser. No. 401,351, Oct. 5, 1964. This application June 16, 1966, Ser. No. 558,143
9 Claims. (Cl. 198—9)

ABSTRACT OF THE DISCLOSURE

Material transfer apparatus having a drivable carriage with an oscillating frame pivotally mounted thereon and supporting a vibratory gathering head for ripping material and feeding the material to a disc feeder mounted on the frame behind the gathering head, the material then being fed to a receiving conveyor also mounted on the frame.

---

Figure 1:
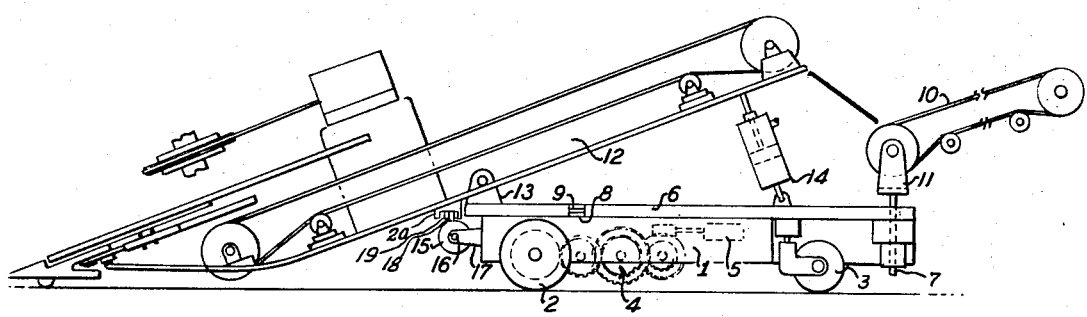

This is a continuation application of our earlier application Ser. No. 401,351 filed Oct. 5, 1964 and now abandoned.

The invention relates to automotive continuous-action facilities adapted for work in limited space conditions, preferably for use in unloading small-lump and bulk products from roofed railroad freight cars.

Automotive continuous-action facilities comprising a chassis with a main carriage and receiving and unloading conveyors mounted on said chassis are known already. The receiving conveyor is equipped with a disk-type pick-up device and is hinged to the chassis in a manner enabling the conveyor to rotate relative to the chassis by a limited angle in the horizontal plane. With this arrangement, the receiving conveyor is moved by a hydraulic mechanism of the loading unit.

A disadvantage of such facilities is their low productivity in limited space conditions, e.g. in unloading roofed railroad freight cars. This can be explained by the fact that there is a necessity to frequently change the location of the facility and the position of its receiving conveyor in order to provide an area of a sufficient width to pick up materials. In particular, this does not permit to unload cars in a pass.

Another disadvantage of the known facilities is their inefficiency in handling caked and/or compressed materials.

Still another disadvantage of the known facilities is their design complexity conditioned by the employment of complicated multi-unit mechanisms with a hydraulic drive to rotate the conveyor and pick-up device.

The main object of the invention is to raise the productivity of the proposed facility by increasing the width of the pick-up area for work in limited space conditions, preferably in unloading roofed railroad freight cars, thus providing for the possibility of carrying out unloading operations in one pass.

Another object of the invention is to simplify the facility design insuring a simultaneous increase in operation reliability.

Still another object of the invention is to ensure the efficiency of the facility in handling materials which can become caked and/or compressed.

The achievement of the aforesaid objects is ensured by an arrangement wherein a rotation mechanism of the pick-up device and receiving conveyor includes an automatic control system effecting an end-to-end pendulum movement of the pick-up device over the whole width of the car interior.

In conjunction with a necessary frequency, such an arrangement of swinging produces the desired increase of the width of the area from where material to be handled is taken by the pick-up device. The width of said area can correspond to the inside width of the car.

According to the invention, the receiving conveyor complete with the pick-up device is supported on a horizontally arranged frame attached to the chassis of a main carriage by means of a vertical trunnion, the rotation mechanism being in the form of a double-acting hydraulic cylinder. The cylinder which is hinged to the horizontal frame can travel transversely, while a rod of the cylinder is secured to brackets of the chassis of the main carriage. Attached to the frame are also rests for actuating limit switches fitted on the chassis of the main carriage, said limit switches being associated with a circuit controlling automatically an electromagnetic slide valve adapted to reverse the hydraulic cylinder when the frame reaches its extreme positions.

The design of the frame rotation mechanism ensuring periodic swinging of the receiving conveyor is simple due to the use of a small quantity of kinematic links.

At the same time, such an arrangement ensures the dependability of the mechanism in operation.

The swinging amplitude of the pick-up device can be calculated supposing that the width of the pick-up area is equal to the car inside width. Such an equality permits to empty each half of the car in one pass.

On the front of the pick-up device is mounted a vibratory gathering head driven alternately. This head, travelling in the plane of the receiving conveyor in a direction normal to the conveyor longitudinal axis, ensures the ripping of the material. The swinging movement of the receiving conveyor complete with the pick-up device contributes, too, to the ripping operation.

Upon deposit on working elements of a feeder, the material is transferred to a transporting element of the receiving conveyor.

Thus, there is obtained efficiency in unloading caked and/or compressed products covering mineral fertilizers, various chemicals, etc. The unloading facility is provided with a distance control.

Illustrated below in conjunction with the attached drawings is a description of an embodiment of the facility according to the present invention.

Figure 2:
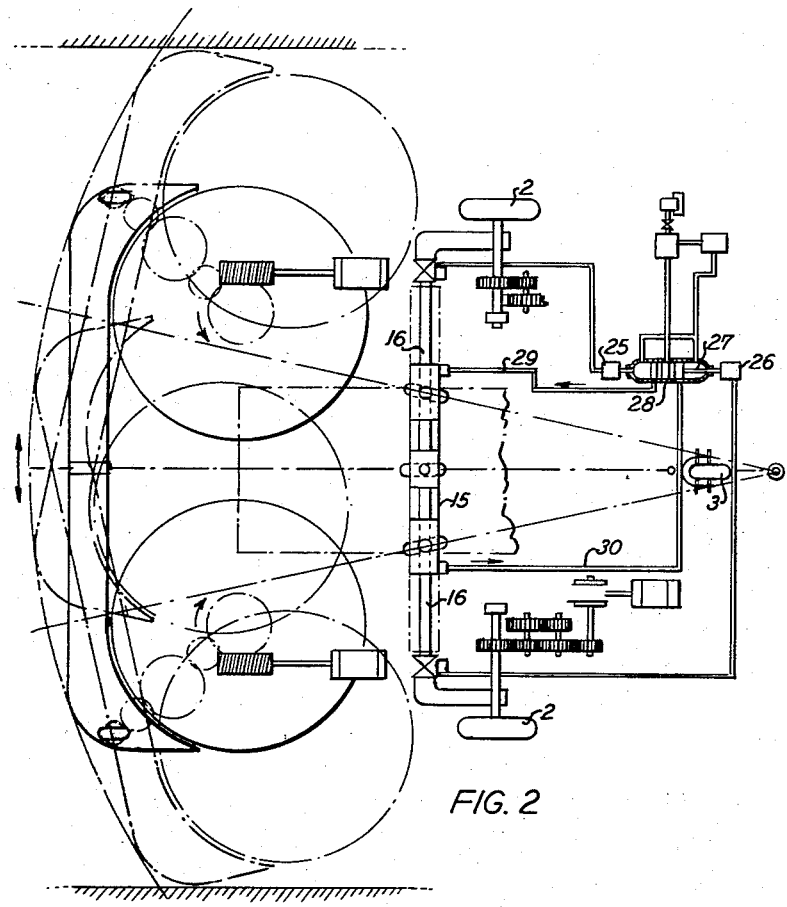
Figure 3:
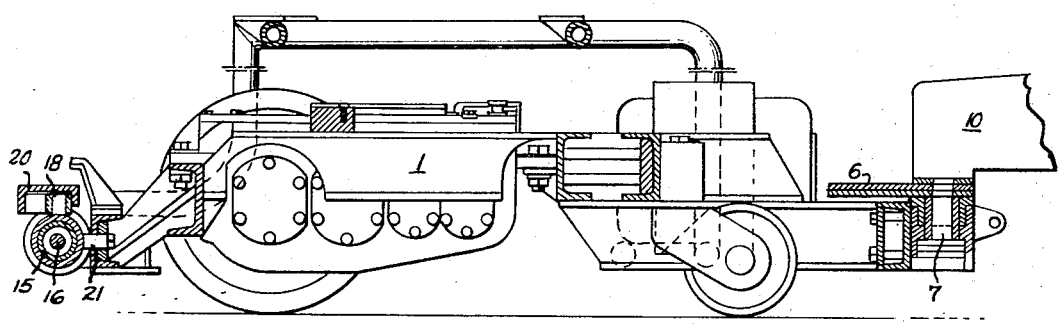
Figure 4:
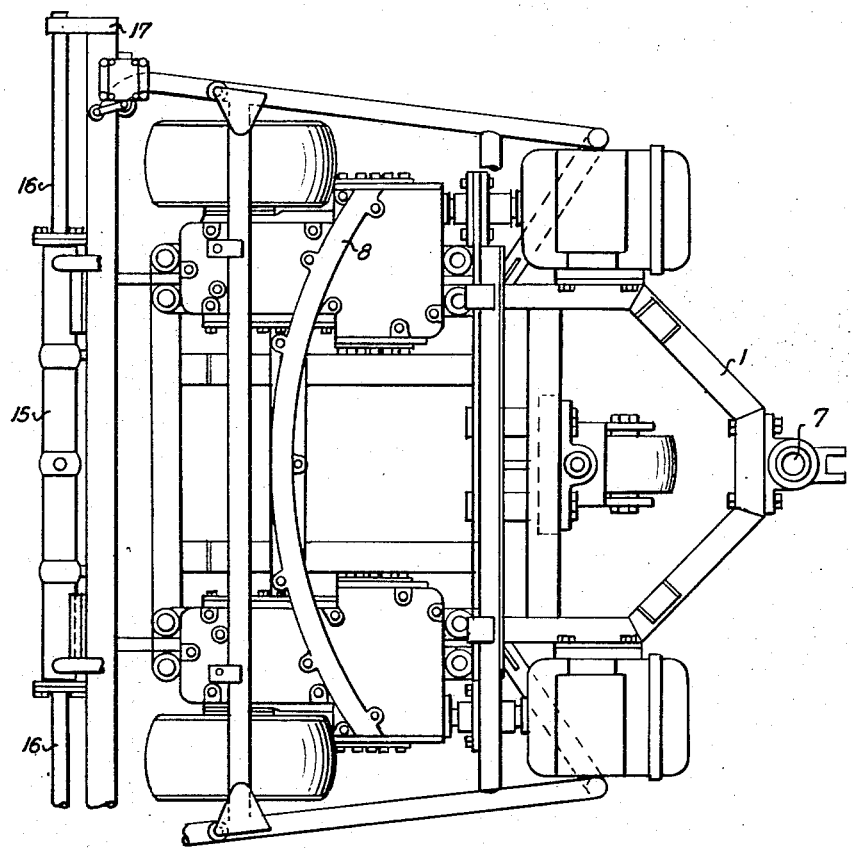
Figure 5:
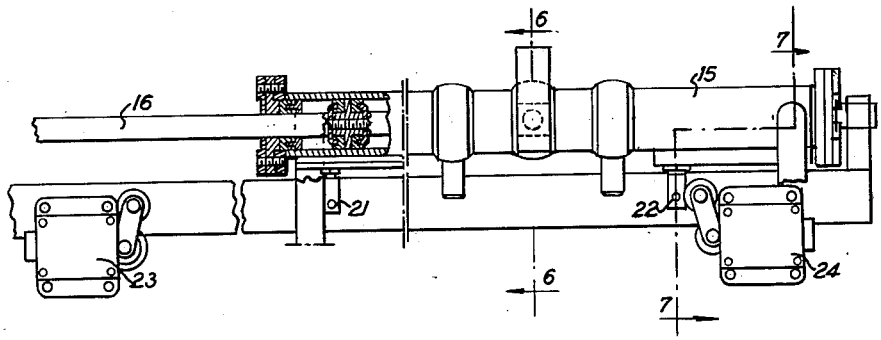
Figure 11A:
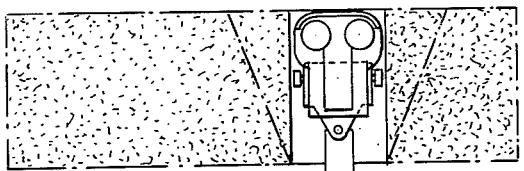
Figure 11B:
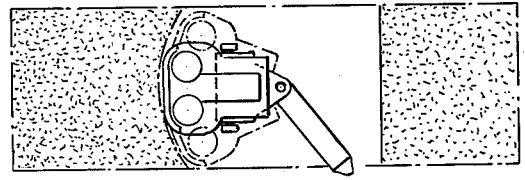
Figure 11C:
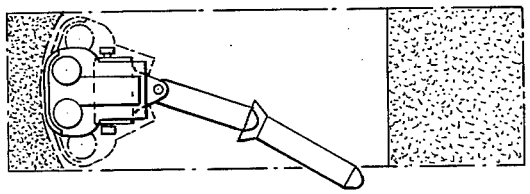
Figure 8:
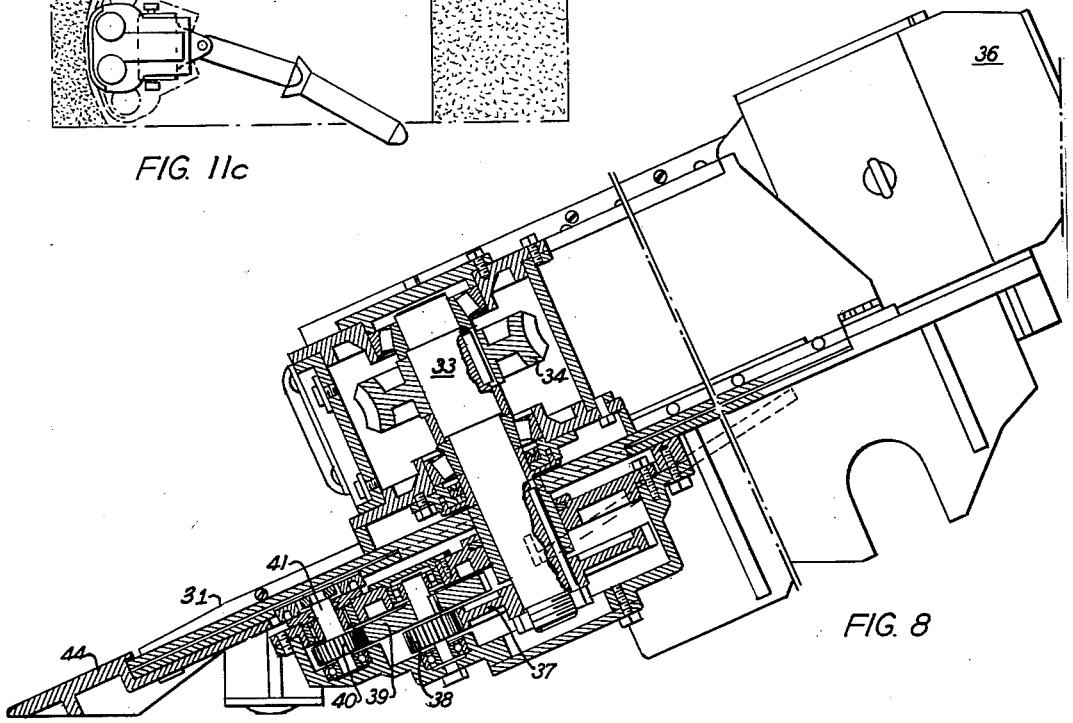
Figure 6:
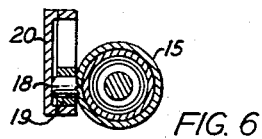
Figure 9:
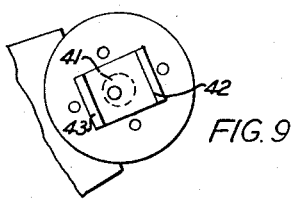
Figure 7:
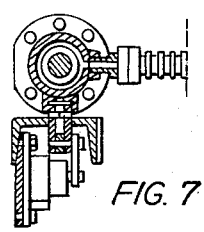
Figure 10:
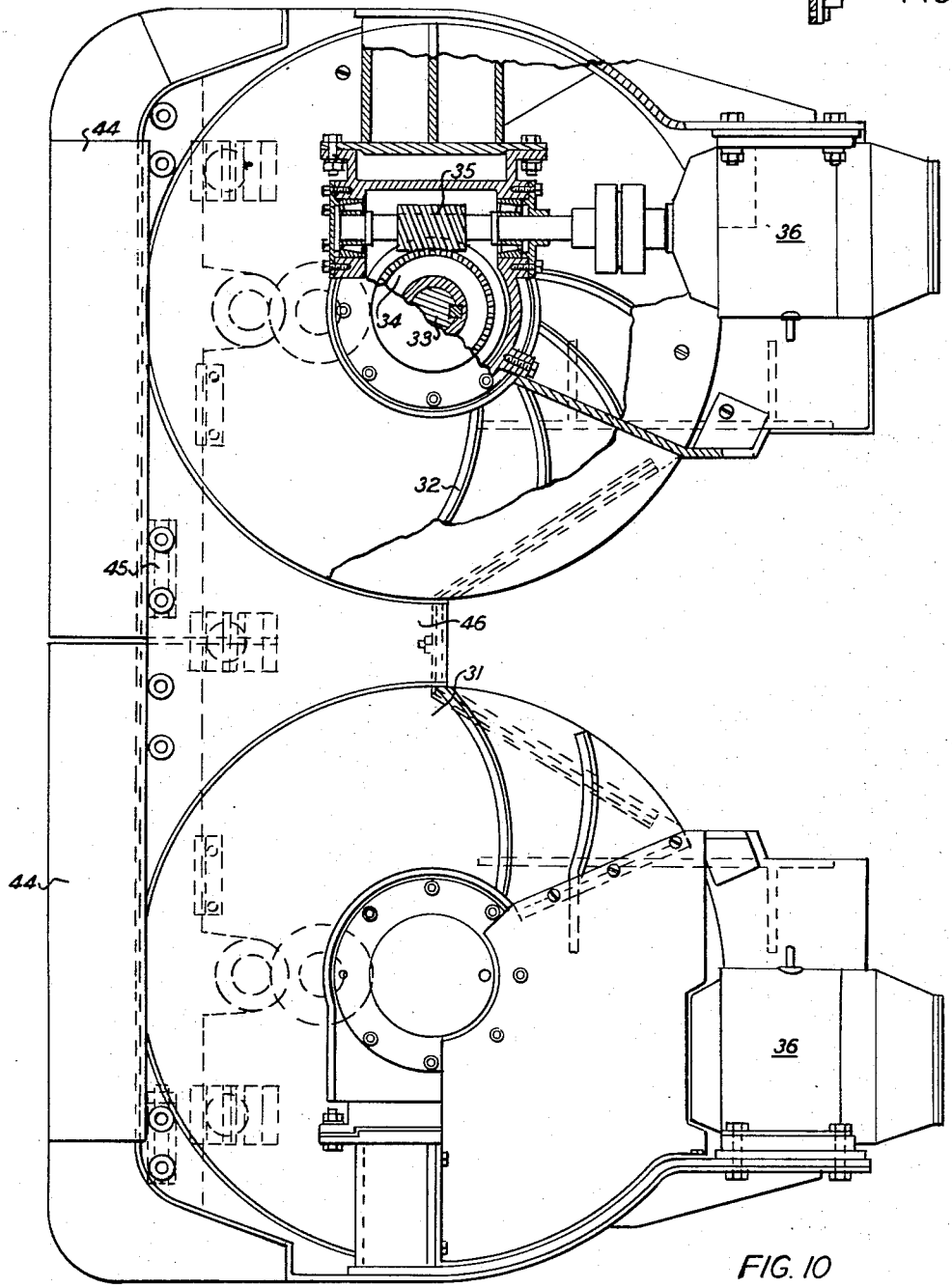

In the drawing:

FIG. 1 schematically depicts the automotive conveying facility,

FIG. 2 is a schematic diagram of the pick-up device swinging mechanism in operation, FIG. 3 is a side view of the automotive facility main carriage and the swinging mechanism attachment to the main carriage, FIG. 4 is a top view of the automotive facility main carriage with the swinging mechanism, FIG. 5 is a top view of the swinging mechanism partly sectioned and the swinging mechanism automatic shifting device, FIG. 6 is a section taken along the line 6—6 (FIG. 5) of the hinge joint of the slide block with the frame of the receiving conveyor, FIG. 7 is a side view of the shifting device partly sectioned along the line 7—7 (FIG. 5), FIG. 8 is a longitudinal section of the pick-up device gathering head drive, FIG. 9 is a view of the drive eccentric, FIG. 10 is top view of the pick-up device of the conveying facility, and FIGS. 11a, 11b and 11c show several positions of the automotive facility in the car.

The facility comprises a self-propelled carriage 1 (FIG.

1) with driving wheels 2 and running wheels 3. Mounted on the carriage 1 is a drive 4 including a motor 5, a train of worm and tooth gears, and a frame 6 which swings in a horizontal plane, said frame being attached to the carriage 1 by means of a trunnion 7 and slides 8, while said trunnion and slides are in engagement with supporting pads 9. An unloading belt conveyor 10 is installed by means of a bracket 11 of the trunnion 7, such an arrangement enabling the conveyor to rotate. A frame 12 of a receiving conveyor is hinged to a bracket 13 of the frame 6. The frame 12 is supported at the rear thereof by a hydraulic cylinder 14 by means of which the receiving conveyor together with a pick-up device on frame 12 can be raised or lowered.

Provided for rotating in a horizontal plane with the frame 6 and the pick-up device and the receiving conveyor 12 is a hydraulic cylinder 15 mounted on the carriage; ends of a piston rod 16 of said cylinder are fixed to brackets 17 (FIG. 4). Attached to the hydraulic cylinder 15 (FIG. 6) is a pin 18 carrying a slide block 19 which is movable in a slot 20 of the frame 12 of the receiving conveyer.

Attached to the cylinder 15 (FIG. 5) are longitudinally adjustable rests 21 and 22 for actuating levers of limit switches 23 and 24 mounted on the carriage. The switches are electrically connected to solenoids of electromagnets 25 and 26 (FIG. 2) acting on a rod 27 of a reversible slide valve 28 connected through pipelines 29 and 30 to the cylinder 15.

Bulk or small-lump materials are fed by means of two disk feeders 31 and 32 (FIG. 10) are fed to the belt of the receiving conveyor 12. Set on shafts 33 of the feeders 31 and 32 are worm wheels 34 which are in engagement with a worm 35 rotated by a motor 36. Apart from the worm wheels 34, set on the shafts 33 of the feeders 31 are also gear wheels 37 which through idler wheels 38, 39, and 40 rotate a shaft 41 and an eccentrically fitted slide block 42. The slide block is rectangular in shape and is mounted with clearance along two parallel sides in a guide slot 43 so as to travel reciprocally in slot 43. The slot 43 can be directly formed in gathering head 44 or in a member coupled thereto so that said slide block forces gathering head 44 to vibrate along guides 45 (FIG. 10) on a frame 46 of the pick-up device.

The operation of the present facility consists in the following: by actuating the drive motors 5 the facility is moved towards the materials to be handled. This done, bits of material are fed to the disk feeders 31, 32 supplying the material to the receiving conveyor 12. From the latter material is transported to the unloading belt conveyor 10.

Material to be fed to the disk feeders 31, 32 is subjected to preliminary ripping and loosening as a result of the translational movement of the gathering heads 44 which cut the material with their sharp edges. The pick-up area width necessary to ensure the required productivity is obtained by a pendulum movement of the horizontal frame 6 together with the pick-up device. This is a result of the action of the cylinder 15 and the reversible valve 28. The working liquid through the pipelines 29 and 30 and through the valve 28 is periodically delivered into and removed from the chambers of the hydraulic cylinder 15. This ensures the movements of the cylinder 15 and the frame 6 in both directions. The extreme positions of the pick-up device are shown by the dotted lines in FIGS. 2 and 11. Upon reaching its extreme position the rest 22 actuates the switch 24 deactivating the solenoid electromagnet 25, the coil of the electromagnet 26 being simultaneously energized. The rod 27 of the slide valve 28 changes position, and the working liquid begins to flow into the pipeline 30. The hydraulic cylinder 15 runs to the opposite position until the stop 21 reaches the limit switch 23 which causes return of the electromagnets controlling the slide valve 28.

Thus, the continuous pendulum movement of the frame 6 proceeds.

Since both ends of the rod 16 are fixedly secured to the brackets 17 of the carriage 1, during the movement of cylinder 15 relative to the rod 16, said cylinder rotates the frame 12 of the receiving conveyor relative to the carriage 1. At the same time, the pin 18 fitted with the roller 19 travels some distance along the slot of the conveyer undercarriage 12.

The turn angle of the pick-up device can be changed by repositioning the rests 21 and 22. If needed, the hydraulic mechanism controlling the turning can be operated manually.

The angle of slope of the receiving conveyor can be changed by means of the hydraulic cylinder 14. Successive positions of the facility engaged in unloading bulk materials are shown in FIGS. 11a, 11b and 11c. At first, the facility is positioned in the car doorway, said facility being moved in the direction normal to the longitudinal axis of the car. When the removal of the material at the place adjacent to the doorway is completed, the facility is turned, the end of the unloading conveyor 10 being left within the doorway. The automatic control of the mechanism for turning the frame 6 starts to function, thus enlarging the pick-up area up to the inside width of the car. In such a way, the car can be unloaded in one pass.

When the facility approaches the car end-side an additional conveyor is installed to remove the material from the interior of the car.

What is claimed is:

1. An automotive continuous-action facility for unloading bulk materials from railroad freight cars, said facility comprising: a carriage including drive and running wheels; a receiving conveyor; an unloading conveyor mounted on said carriage; a disk-type pick-up device attached to the receiving conveyor for feeding material thereto; a horizontally swingable frame positioned above said carriage and having one end attached to the receiving conveyor and another end pivotably attached to the carriage; a hydraulic mechanism mounted on the carriage for swinging the pick-up device together with the receiving conveyor, said mechanism including a double-acting hydraulic cylinder, which is hinged to the receiving conveyor and is capable of traveling transversely within a limited distance; brackets mounted on said carriage; a piston rod for said hydraulic cylinder having ends which are fixedly secured to said brackets; rests positioned on the ends of said hydraulic cylinder; a pin fitted in a middle portion of said hydraulic cylinder, a slide block carried by said pin and traveling in a slot provided in said receiving conveyor; limit switches fitted on the carriage to control the hydraulic mechanism for regulating the degree of swinging of the pick-up device and receiving conveyor; vibratory gathering head means on the pick-up device for ripping material; means to drive the pick-up device; and means for driving the drive wheels of the carriage.

2. An automotive continuous-action facility for unloading bulk materials from railroad freight cars, said facility comprising: a carriage including drive and running wheels; a receiving conveyor; an unloading conveyor mounted on said carriage; a disk-type pick-up device attached to the receiving conveyor for feeding material thereto; a horizontally swingable frame positioned above said carriage and having one end attached to the receiving conveyor and another end pivotably attached to the carriage; a hydraulic mechanism mounted on the carriage for swinging the pick-up device and receiving conveyor, said mechanism including a double-acting hydraulic cylinder which is hinged to said receiving conveyor and is capable of traveling transversely within a limited distance; a reversible slide valve for changing the direction of movement of said hydraulic cylinder; pipelines connecting said reversible valve to said hydraulic cylinder; electromagnets acting on a piston of said slide valve; brackets, mounted on the carriage; a piston rod for said hydraulic cylinder having ends which are fixedly secured to said brackets; rests positioned on said ends of said cylinder; a pin fitted in a middle portion of said hydraulic cylinder, a slide block carried by said pin and traveling in a slot provided in said receiving conveyor; limit switches fitted on the carriage to control the hydraulic mechanism for regulating the degree of swinging of the pick-up device and receiving conveyor, said limit switches being electrically connected to said electromagnets acting on the rod of the reversible slide valve; vibratory gathering head means on the pick-up device for ripping material, said heads being driven by a slide block mounted eccentrically; and drive means for driving the pick-up device, said drive means including electric motors and reduction gears interconnected through idler gears.

3. Material transfer apparatus comprising a drivable carriage, frame means pivotally supported on said carriage, receiving conveyor means mounted on the frame means for transporting material, hydraulic means on said carriage for oscillating the frame means and the receiving conveyor means relative to the carriage, unloading conveyor means mounted on the carriage for receiving transported material from the receiving conveyor means and means on the frame means for engaging material and feeding the same to the receiving conveyor means, vibratory gathering heads for ripping the material and disk feeders behind said gathering heads for feeding the ripped material to the receiving conveyor means.

4. Material transfer apparatus as claimed in claim 3, wherein said hydraulic means comprises a reciprocally movable cylinder mounted on the carriage and means connecting the cylinder and the frame means to produce oscillation of the latter as the cylinder undergoes reciprocal movement.

5. Material transfer apparatus as claimed in claim 4, wherein said hydraulic means comprises reversible drive means therefor, and first and second switch means in spaced relation along the path of the cylinder, said switch means being connected to said drive means for reversing the direction of drive of the cylinder when the latter reaches said switch means.

6. Material transfer apparatus as claimed in claim 3, comprising means on the frame means for tilting the receiving conveyor means relative to the carriage.

7. Material transfer apparatus as claimed in claim 3, comprising means mounted on the receiving conveyor means for driving both the gathering heads and the disk feeders.

8. Material transfer apparatus as claimed in claim 3, comprising means pivotally connecting the unloading conveyor means and the carriage to permit variation of the position of the unloading conveyor means and the carriage.

9. An automotive continuous-action facility for unloading bulk materials from railroad freight cars, said facility comprising: a carriage including drive and running wheels; a receiving conveyor; an unloading conveyor mounted on said carriage; a disk-type pick-up device attached to the receiving conveyor for feeding material thereto; a frame positioned above said carriage, said frame having one end connected to the receiving conveyor and an opposite end pivotably connected to the carriage; a hydraulic mechanism mounted on the carriage and engaging the receiving conveyor for turning the pick-up device and the receiving conveyor in oscillation relative to the carriage; limit switches on the carriage to control the hydraulic mechanism for regulating the degree of turning of the receiving conveyor and pick-up device; vibratory gathering head means on the pick-up device for ripping material and feeding the same to the receiving conveyor; means for driving the pick-up device; and means for driving the drive wheels of the unloading facility.

References Cited
UNITED STATES PATENTS

| | | | |
|---|---|---|---|
| 1,313,217 | 8/1919 | Jackson | 198—88 |
| 2,960,208 | 11/1960 | Sibley | 198—112 |
| 3,003,611 | 10/1961 | Pelzer | 198—88 |
| 3,205,859 | 9/1965 | Fine | 198—112 |

FOREIGN PATENTS

| | | |
|---|---|---|
| 880,585 | 4/1943 | France. |

RICHARD E. AEGERTER, *Primary Examiner.*